(12) United States Patent
Baijense

(10) Patent No.: US 8,476,321 B2
(45) Date of Patent: Jul. 2, 2013

(54) FISCHER-TROPSCH CATALYST

(75) Inventor: Cornelis Roeland Baijense, Gameren (NL)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/838,793

(22) Filed: Jul. 19, 2010

(65) Prior Publication Data

US 2011/0021646 A1 Jan. 27, 2011

Related U.S. Application Data

(63) Continuation of application No. PCT/NL2009/050051, filed on Feb. 5, 2009.

(30) Foreign Application Priority Data

Feb. 5, 2008 (EP) ..................................... 08151077

(51) Int. Cl.
C07C 27/00 (2006.01)
B01J 23/00 (2006.01)
B01J 21/00 (2006.01)
B01J 20/00 (2006.01)

(52) U.S. Cl.
USPC ........... 518/715; 502/326; 502/327; 502/329; 502/332; 502/340; 502/341; 502/342; 502/343; 502/349; 502/355; 502/415; 502/439

(58) Field of Classification Search
USPC ................. 502/326, 327, 329, 332, 340, 341, 502/342, 343, 349, 355, 415, 439; 518/715
See application file for complete search history.

(56) References Cited

U.S. PATENT DOCUMENTS

| | | | | |
|---|---|---|---|---|
| 3,875,253 A * | 4/1975 | Huang | ........................... | 585/660 |
| 3,904,554 A * | 9/1975 | Dicks | ........................... | 502/329 |
| 3,997,582 A * | 12/1976 | Khera | ........................... | 518/715 |
| 4,005,177 A * | 1/1977 | Weidenbach et al. | ...... | 423/213.5 |
| 4,039,302 A * | 8/1977 | Khera | ........................... | 518/712 |
| 4,049,571 A * | 9/1977 | Nissen et al. | ................. | 502/170 |
| 4,107,091 A * | 8/1978 | Khera | ........................... | 502/329 |
| 4,210,561 A * | 7/1980 | Antos | ........................... | 502/226 |
| 4,239,657 A * | 12/1980 | Nissen et al. | ................. | 502/329 |
| 4,280,930 A * | 7/1981 | Antos | ........................... | 502/327 |
| 4,333,855 A * | 6/1982 | Gardner et al. | ............... | 502/220 |
| 4,562,174 A * | 12/1985 | Stiles | ........................... | 502/174 |
| 4,579,995 A * | 4/1986 | Mauldin | ........................ | 585/640 |
| 4,655,906 A * | 4/1987 | Bjornson et al. | .............. | 208/217 |
| 4,780,481 A * | 10/1988 | Courty et al. | ................. | 518/713 |
| 4,812,434 A * | 3/1989 | Pohlmann et al. | ............ | 502/178 |
| 4,826,800 A * | 5/1989 | McAteer | ....................... | 502/303 |
| 5,096,688 A * | 3/1992 | Miller et al. | ................ | 423/437.2 |
| 5,134,108 A * | 7/1992 | Thakur et al. | ................. | 502/318 |
| 5,227,407 A * | 7/1993 | Kim | ............................. | 518/700 |
| 5,336,656 A * | 8/1994 | Campbell | ..................... | 502/329 |
| 5,585,316 A * | 12/1996 | Nay et al. | ......................... | 502/50 |
| 5,811,365 A | 9/1998 | Barry | | |
| 6,627,572 B1 * | 9/2003 | Cai et al. | .......................... | 502/84 |
| 7,387,983 B2 * | 6/2008 | Holzle et al. | .................. | 502/346 |
| 7,563,747 B2 * | 7/2009 | Baijense et al. | .............. | 502/329 |
| 7,732,370 B2 * | 6/2010 | Casci et al. | .................... | 502/329 |

FOREIGN PATENT DOCUMENTS

WO 2005/105299 A1 11/2005

OTHER PUBLICATIONS

International Search Report Relating to corresponding PCT/NL2009/050051.

* cited by examiner

*Primary Examiner* — Cam N. Nguyen

(74) *Attorney, Agent, or Firm* — Bernard Lau

(57) ABSTRACT

The present invention is directed to a catalyst suitable for catalyzing a Fischer-Tropsch reaction, said catalyst comprising cobalt metal supported on zinc-oxide and an amount of zirconium(IV)oxide and/or aluminum oxide of between 0.5 and 2.5 wt. % calculated as metal, based on the weight of the calcined catalyst.

8 Claims, No Drawings

FISCHER-TROPSCH CATALYST

RELATED APPLICATIONS

This application is a continuation of PCT application number PCT/NL2009/050051 designating the United States and filed Feb. 5, 2009; which claims the benefit of EP patent application number 0815107738 and filed Feb. 5, 2008 both of which are hereby incorporated by reference in their entireties.

FIELD OF THE INVENTION

The invention relates to a Fischer-Tropsch catalyst comprising cobalt and zinc, as well as to the use of such a catalyst in a Fischer-Tropsch process.

BACKGROUND OF THE INVENTION

A catalyst containing cobalt oxide and zinc oxide for use in the synthesis of $C_1$-$C_3$ aliphatic hydrocarbons is known from U.S. Pat. No. 4,039,302.

WO-A-03/090925 describes a catalyst comprising particles of a cobalt and zinc co-precipitate, said particles having a volume average particle size of less than 150 μm and a particle size distribution wherein at least 90% of the volume of the catalyst particles have a size between 0.4 and 2.5 times the average particle size. Although this catalyst is an improvement over the previously known catalysts, there is still room for improvement, especially with respect to the balance of properties required between the properties needed during activation on the one hand and attrition and activity properties during FT operation on the other hand.

In the case of slurry-phase Fischer Tropsch catalysts, always a good balance should be adjusted between activity (Fischer Tropsch performance) and separation properties. In that respect, the (powder) catalyst should have an optimized particle size distribution giving good mass-transfer and separation properties. These properties should not change substantially during time on stream in the process so that activity and separation properties are retained over long periods of time.

Prior art supported cobalt catalysts for Fischer Tropsch are generally based on a mechanically strong support that is impregnated with a cobalt solution and subsequently dried, calcined and reduced. Alternatively, a mechanically strong cobalt-support system can be precipitated by optimizing the precipitation conditions. Such formulations are mechanically stable in both the fluid-bed catalyst activation and the slurry-phase Fischer Tropsch reactor, although attrition in the Fischer Tropsch reactor may lead to fines (submicron particles) formation and consequently separation problems. The preferred particle size distribution to achieve good fluidization behaviour during fluid-bed activation is generally different from the required, preferred particle size distribution for the Fischer Tropsch process. The chosen particle size of the fresh catalyst always forms a compromise between the two.

In the various patents it has been disclosed that the catalyst can consist of cobalt and zinc oxide. It is, however, also indicated that the catalyst contains one or more other components, such as one or more promoters. Without further exemplification promoters such as ruthenium, hafnium, platinum, zirconium, palladium, rhenium, cerium, or lanthanum have been mentioned, typically in a cobalt to promoter atomic ratio of up to 10:1. No effect of the use of promotors has been disclosed in those patents.

In view of the requirement of prolonged use, also under severe conditions, there is a need for a catalyst having improved mechanical strength, or (the result thereof), less attrition.

The present invention is based on the surprising discovery that the use of zirconium(IV)oxide and/or aluminiumoxide as promoter, in specific, limited amounts, in a cobalt zinc oxide FT-catalyst, leads to improved mechanical strength.

The invention is accordingly directed to a catalyst suitable for catalyzing a Fischer-Tropsch reaction, said catalyst comprising cobalt metal supported on zinc-oxide and an amount of zirconium(IV)oxide and/or aluminiumoxide of between 0.5 and 2.5 wt. % calculated as metal, based on the weight of the calcined catalyst.

In the catalyst of the invention both aluminium oxide and zirconium oxide may be used, but it is preferred to use zirconium.

In a preferred embodiment, the amount of aluminium oxide and/or zirconium oxide is between 0.8 and 2 wt. %, as defined above. It has been found that with the specified amounts of these promotors, in a standard attrition test, the average particle size is maintained, and, in combination, the amount of fines is reduced, as is shown in the examples.

A catalyst according to the present invention shows a marked decrease in the amount of fines caused in a standard attrition test, said amount of fines being characterized by the Δ-minus 5 μm, i.e. the increase of the amount of particles below 5 μm. This value is generally below 7.5%. The test is defined in the Examples.

A further characterization of the low attrition is that the decrease of the average particle size, defined as the decrease of the d[v,0.5]–value, or Δ–d[v,0.5], is below 2.5 μm, where d[v,0.5] is the size below which 50% of the particle volume exists in a volume distribution of the particle size distribution curve. This number typically applies for a powder catalyst with an initial average particle size (d[v,0.5]) in the range of up to 75 μm prior to the standard attrition test.

A catalyst according to the invention has been found to be particularly favourable for use in a stirred slurry-phase reactor, bubble-column reactor, loop reactor or fluid-bed reactor.

A catalyst according to the invention shows very favourable separation properties and can for example very suitably be separated from the reaction mixture by filtration.

A catalyst according to the invention has an extremely good balance between activity and separation properties Preferably the volume average particle size of the catalyst is less than 75 μm, more preferably less than 50 μm. The lower limit is not particular critical, provided it meets the criteria of the invention. For practical purposes it is preferred that the size is at least such that the particles can still be separated from a liquid reaction mixture. Particularly suitable is for example a catalyst with a volume average particle size of 2 μm or more. Very good results have been achieved with a catalyst having a volume average particle size in the range of 2-50 μm.

The volume average particle size and particle size distribution have been determined using a Malvern MS2000 apparatus, on which particle size distributions in the range 0.01 μm to 2000 μm can be measured. The method is based on a laser diffraction technique with the solid (powder) dispersed in water. The slurry is pumped through a measuring cell, where the scattering profile of the laser beam through the cell is recorded. The scattering profile is subsequently converted to the volume particle size distribution of the powder in the slurry, using the Malvern equipment software. No ultrasonic treatment was applied prior to the measurement.

Preferably the pore volume of the catalyst—as determined by nitrogen adsorption ($N_2$-BET), measured on an Ankersmit Quantachrome Autosorb-6 apparatus, after degassing the sample at 180° C. to a pressure of 3.3 Pa (25 mTorr)—is at least mainly formed by pores having a diameter in the range of 5-100 nm. Much preferred wherein there are essentially no pores with a diameter of less than 5 nm (in particular less than 5% of the pore volume formed by pores with a diameter of less than 5 nm). It has been found that such a catalyst has particularly good diffusion properties for reactant and product. Such a catalyst has also been found to be highly selective in $C_5^+$ production in a Fischer-Tropsch process.

Very good results have been achieved with a catalyst having a pore volume of less than 0.6 ml/g. The pore volume is preferably at least 0.05 ml/g. Particularly suitable is a catalyst with an pore volume of less than 0.5 ml/g.

Such a catalyst has been found to have particularly good physical strength properties, which is advantageous in applications in various types of reactors, including slurry-phase reactors, loop-reactors, bubble-column reactors and fluid-bed reactors.

The catalyst of the invention is based on cobalt on zinc oxide. The composition of the catalyst can be varied widely, which composition the skilled professional will know to determine, depending upon the intended purpose. Preferably, the zinc to cobalt atomic ratio is in the range of 75 to 0.1, preferably of 40 to 0.1 and more preferably in the range of 20 to 0.3.

Very good results have been obtained with a catalyst according to the invention which is essentially free of sodium. It has been found that a catalyst containing a relatively high amount of sodium is reduced in strength. Further, the presence of sodium has been found to be detrimental to the activity of the catalyst, reducing its Fischer-Tropsch activity. Therefore, a catalyst with a sodium content of less than 0.5 wt. %, more in particular of 0 to 0.15 wt. %, even more in particular of 0 to 0.05 wt. % based upon the weight of the catalyst, is preferred.

Very good results have been achieved with a catalyst according to the invention having a low content of copper or being essentially free of copper. Copper may stimulate side reactions, such as the formation of an alcohol by hydrogenation of a ketone, an aldehyde or a carboxylic acid, which are usually preferably avoided or suppressed, especially in a Fischer-Tropsch process. The copper content is preferably less than 2 wt. %, more preferably 0 to 0.5 wt % even more preferably 0 to 0.2 wt. %, based upon the weight of the catalyst.

The preparation of the catalyst of the present invention comprising cobalt and zinc oxide and the aluminium oxide and/or zirconium(IV)oxide promotor, can be done by co-precipitation of cobalt and zinc ions, together with the promoter ions.

In order to produce the catalyst with the specific structure, various options are available.

A very suitable method is based on the method described in WO 03/090925, whereby the process is modified in such a way that the structure of the present invention is obtained. This can, for example, be done by changing the stirring speed or the rate of injection of the solution(s) in the reaction vessel or by applying other types of agitation. As the particles of the catalyst of the present invention are generally smaller and have a different particle size distribution, compared to said document, higher stirring speeds, shorter contact time and/or higher injection speeds are preferred.

In the alternative one may produce first particles that are within the ranges of WO 03/090925 following which the particles are comminuted to obtain the catalyst of the invention, for example by ultrasonic treatment or another comminuting treatment.

Generally the process comprises a coprecipitation method, wherein an acidic solution comprising zinc ions and cobalt ions and an alkaline solution are supplied to a reactor comprising an aqueous medium, preferably water or an aqueous solution, wherein the acidic solution and alkaline solution are contacted in the aqueous medium and a precipitate comprising cobalt and zinc is formed. The precipitate is thereafter separated from the aqueous medium (which may have formed a slurry together with the precipitate). The separated cobalt and zinc comprising precipitate is then dried and may be post-treated, e.g. calcined, etc, to form said catalyst.

The promoter ions are preferably included in the acidic solution. As precursors for the promoters, promotor ion salts, soluble in an acidic (pH<5) are preferably used, such as zirconyl(IV) nitrate or $ZrCl_4$ in the case of zirconium promoted catalysts, or hydrated aluminium sulphate for preparing aluminum promoted catalysts.

The combination of acidic solution and alkaline solution is preferably chosen such that the components of the acidic solution and of the alkaline solution are soluble in the aqueous medium, but that the cobalt and zinc and possible promoter precipitate when they are contacted with the alkaline solution, while the counter ions of zinc, cobalt and possible promoter substantially remain in solution. The skilled professional will know how to choose appropriate conditions, such as the type of counter ions and the concentrations for each of the components.

This method has been found to be particularly suitable for preparing a catalyst as described above.

Preferably the precipitation of particles is carried out at a substantially constant pH, in particular at a pH value varying at most ±0.2 pH units around a set-point value. Thus it has been found possible to make a catalyst precursor with very favourable free flowing characteristics and good mechanical strength properties.

Preferably, the alkaline solution and the acidic solution are supplied to the reactor simultaneously (from separate conduits).

Optionally the cobalt in the isolated and dried precipitate or calcined product is reduced to metallic cobalt Suitable sources for ionic zinc respectively ionic cobalt include salts thereof that are soluble in the acidic solution and in water in a sufficient concentration. Preferred examples of such salts include zinc nitrate respectively cobalt nitrate and zinc acetate respectively cobalt acetate and other inorganic or organic salts of cobalt respectively zinc that have a similar solubility in the acidic solution Suitable components for co-precipitating with the cobalt ions and zinc ions present are inorganic salts and organic salts that are soluble in an aqueous alkaline solution in a sufficient concentration, such as hydroxides, carbonates, urea, isocyanates and any other salt that can be used as base source and that can be dissolved water of in the alkaline solution. Preferred examples of such salts include ammonium carbonate, ammonium bicarbonate and other inorganic or organic salts of carbonate that have at least a similar solubility in the alkaline solution.

The pH of the acid solution is preferably in the range of 1-5. The pH of the alkaline solution is preferably in the range of 6-14. The pH in the aqueous medium (wherein the co-precipitation takes place) is preferably in the range of 4-9, depending upon the type of precursor salts used as a source for cobalt, zinc and alkaline component(s).

The temperature during the co-precipitation process is preferably chosen in the range of 5-98° C., more preferably in the range of 25-80° C.

The present invention further relates to the use of a catalyst according to the invention in a slurry reactor, a loop reactor, a bubble-column reactor or a fluid-bed reactor. The present invention further relates to the use of a catalyst according to the invention in a Fischer-Tropsch process or a functional group hydrogenation process, such as nitrile hydrogenation to amines.

EXAMPLES

The invention is further illustrated by the following examples.

Example 1

Catalyst Preparation

A metal solution (1000 ml) containing 21.0 g/l cobalt, 62.8 g/l zinc and approx. 1.8 g/l zirconium was prepared by dissolving 103.8 g of $Co(NO_3)_2 \cdot 6H_2O$ and 285.5 g of $Zn(NO_3)_2 \cdot 9H_2O$ and 5.3 g/l of $ZrO(NO_3)_2 \cdot xH_2O$ in 1000 ml of demineralised water. The base solution was prepared by dissolving 142 g of $(NH_4)_2CO_3$ in 1000 ml of demineralised water. The metal and base solution were injected simultaneously at equal flow rates (1000 ml/hr) into a well stirred, baffled precipitation vessel containing 1750 ml of demineralised water. The temperature during precipitation was maintained at 75° C. The input power (N) was 105 kW, calculated using the formula $$N = \frac{k \times \rho \times n^3 \times d^5}{V}$$

Where:
N=input power of turbine impeller (Watt)
k=factor 6 for a turbine impeller
$\rho$=stirred liquid density (kg/m$^3$)
n=agitation rotational speed (s−1)
d=agitator diameter (m)
V=volume of precipitation vessel (l)

The pH was kept constant at pH 6.0 by providing acid solution and alkaline solution at equal addition rates. The resulting precipitate was washed with demineralised water and dried overnight at 110° C. The dried catalyst was heated from room temperature with 150° C./hr to 500° C. and calcined for 5 hours at 500° C. The properties of the calcined catalyst are summarised in Table 1.

Example 2

A metal solution (1000 ml) containing 21.0 g/l cobalt, 63.5 g/l zinc and 1.0 g/l Al was prepared by dissolving 103.8 g of $Co(NO_3)_2 \cdot 6H_2O$, 289.0 g of $Zn(NO_3)_2 \cdot 9H_2O$ and 13.9 g of $Al(NO_3)_3 \cdot 9H_2O$ in 1000 ml of demineralised water. The base solution was prepared by dissolving 146 g of $(NH_4)_2CO_3$ in 1000 ml of demineralised water. The metal and base solutions were injected simultaneously at equal flow rates (1000 ml/hr) under the same conditions as described for Example 1. The pH was kept constant at pH 6.4 by providing acid solution and alkaline solution at equal addition rates. The resulting precipitate was washed with demineralised water and dried overnight at 110° C. The dried catalyst was heated from room temperature with 150° C./hr to 500° C. and calcined for 5 hours at 500° C. The properties of the calcined catalyst are summarised in Table 1.

Example 3

Comparative

A metal solution (1000 ml) containing 21.0 g/l cobalt and 64.3 g/l zinc was prepared by dissolving 103.8 g of $Co(NO_3)_2 \cdot 6H_2O$ and 292.3 g of $Zn(NO_3)_2 \cdot 9H_2O$ in 1000 ml of demineralised water. The base solution was prepared by dissolving 146 g of $(NH_4)_2CO_3$ in 1000 ml of demineralised water. The metal and base solutions were injected simultaneously at equal flow rates (1000 ml/hr) under the same conditions as described for Example 1. The pH was kept constant at pH 6.3 by providing acid solution and alkaline solution at equal addition rates. The resulting precipitate was washed with demineralised water and dried overnight at 110° C. The dried catalyst was heated from room temperature with 150° C./hr to 500° C. and calcined for 5 hours at 500° C. The properties of the calcined catalyst are summarised in Table 1.

Example 4

Measurement of the Particle Size Distribution

The particle size distribution of a catalyst according to the invention was measured on a Malvern MS2000 apparatus, on which particle size distributions in the range 0.01 µm to 2000 µm can be measured. The method is based on a laser diffraction technique with the solid (powder) dispersed in water. The slurry is pumped through a measuring cell, where the scattering profile of the laser beam through the cell is recorded. The scattering profile is subsequently converted to the particle size distribution of the powder in the slurry, using the Malvern equipment software.

From the particle size distribution, particular numbers are calculated, describing the volume particle size distribution of the powder, such as:

D[v,0.9]=particle size (µm) below which 90% of the particles exists.

D[v,0.5]=particle size (µm) below which 50% of the particles exists, also designated as the average particle size distribution.

D[v,0.1]=particle size (µm) below which 10% of the particles exists.

From the above numbers, also the span is calculated, which is defined as:

$$\text{Span} = \frac{D[v, 0.9] - D[v, 0.1]}{D[v, 0.5]}$$

The span is in fact a measure for the broadness of the particle size distribution, a low number for the span means a narrow particle size distribution.

Example 5

Jet Attrition Test

Jet-attrition tests have been used to determine the mechanical strength of the powder catalysts. During this test, a high speed nitrogen stream is lead through a narrow opening (diaphragm, 0.5 mm diameter) in the centre at the bottom of a stainless steel tube and thus fed through a bed of catalyst particles. As a result of the very high linear speed of the nitrogen flow, the particles start to move and fluidize and start colliding on the metal wall of the tube, resulting in a particular extent of attrition, thus leading to fines formation. The jet attrition tests were performed in a one inch tube (length 1.55 meter, internal diameter 25.5 mm), equipped with a membrane filter-unit at the top of the tube. Microfilters of Schleicher & Schuell (ME 24, 0.2 μm, diameter 142 mm) have been used. The tube is connected to a nitrogen flow system, where the input pressure is controlled at 4 bar.

The tube is loaded with 20±0.1 g of the catalyst. The catalyst is treated by adjusting the nitrogen flow through the diaphragm (0.5 mm diameter) at 5.4 l/min and performing the fluidization treatment for exactly one hour. The attrition is determined by measuring the particle size distribution before and after the jet-attrition test by Malvern light scattering in liquid phase, where quantitative numbers for the attrition are derived from the change of the average particle size (the delta–D[v,0.5] value) and the increase of fines in the catalyst, defined as the increase of particles below 5 μm (the delta-minus 5 μm) during the jet-attrition tests.

Example 6

Catalyst Characterization Data and Attrition Properties

Table 1 describes the properties of the catalyst according to the invention (Example 1) and a comparison with a prior art catalyst (Example 2).

TABLE 1

Analytical and attrition data of promoted Co/ZnO catalysts.

|  |  | Catalyst according to this invention (Example 1) | Catalyst according to this invention (Example 2) | Comparative catalyst (Example 3) |
|---|---|---|---|---|
| Cobalt content | wt % | 16.6 | 20.0 | 17.9 |
| Zirconium content | wt % | 1.2 | — | — |
| Aluminum content | wt % | — | 0.91 | — |
| BET-surface area | m²/g | 28 | 35 | 23 |
| N₂ pore volume | ml/g | 0.19 | 0.26 | 0.22 |
| Jet-attrition test: |  |  |  |  |
| Δ-minus 5 μm | (%) | +5.2 | +4.1 | +9.3 |
| Δ-d[v, 0.5]* | μm | −0.4 | −2.1 | −6.6 |

*d[v, 0.5] = Average particle size in volume particle size distribution.

What is claimed:

1. Catalyst for catalyzing a Fischer-Tropsch reaction, comprising cobalt metal supported on zinc-oxide and an amount of zirconium (IV) oxide or aluminum oxide of between 0.5 and 2.5 wt. % calculated as metal, based on the weight of the calcined catalyst, wherein the Δ–minus 5μ (as defined herein) is <7.5%.

2. Catalyst according to claim 1, wherein the amount of zirconium or aluminum is between 0.8 and 2 wt. %.

3. Catalyst according to claim 1, wherein the zinc to cobalt ratio (based on metal) is from 75 to 0.1, preferably from 20 to 0.3.

4. Catalyst according to claim 1, wherein the amount of zinc is between 5 and 90 wt. % and the amount of cobalt is between 1 and 25 wt. %, calculated as metal, based on the weight of the calcined catalyst.

5. Catalyst according to claim 1, wherein the Δ–d[v,0.5] (as defined herein) is <2.5 μm.

6. Catalyst according to claim 1, comprising cobalt metal supported on zinc-oxide and an amount of zirconium(IV) oxide of between 0.5 and 2.5 wt. % calculated as metal, based on the weight of the calcined catalyst.

7. A method of conducting a Fischer-Tropsch process or a functional group hydrogenation comprising using the catalyst according to claim 1 in a slurry reactor, a loop reactor, a bubble-column reactor, or a fluid-bed reactor.

8. A method of conducting a Fischer-Tropsch process, comprising using the catalyst according to claim 1.

* * * * *